United States Patent

Sato et al.

[11] Patent Number: 5,803,867
[45] Date of Patent: Sep. 8, 1998

[54] FLUID CONTROL CIRCUIT OF AUTOMATIC TRANSMISSION

[75] Inventors: Osamu Sato, Fujisawa; Kazuhiro Takatori, Yokohama, both of Japan

[73] Assignee: Nissan Motor Co., Ltd., Yokohama, Japan

[21] Appl. No.: 800,199

[22] Filed: Feb. 13, 1997

[30] Foreign Application Priority Data

Feb. 15, 1996 [JP] Japan ...................................... 8-27762

[51] Int. Cl.⁶ .................................................. F16H 61/06
[52] U.S. Cl. ........................................................ 477/151
[58] Field of Search ............................................ 477/151

[56] References Cited

U.S. PATENT DOCUMENTS

| 3,559,669 | 2/1971 | Dach .................................. 137/102 |
| 3,583,422 | 6/1971 | Friedrichshafen et al. ........... 137/116.3 |
| 4,033,203 | 7/1977 | Hirosawa et al. ...................... 477/151 |
| 4,722,250 | 2/1988 | Sumiya et al. ......................... 477/151 |
| 4,843,917 | 7/1989 | Van Selous et al. ..................... 74/868 |
| 4,882,952 | 11/1989 | Kashihara et al. ..................... 477/151 |
| 5,095,775 | 3/1992 | Ueki ....................................... 477/151 |
| 5,111,719 | 5/1992 | Okahara .................................. 74/867 |
| 5,478,288 | 12/1995 | Sakakibara et al. .................... 475/129 |

*Primary Examiner*—Dirk Wright
*Attorney, Agent, or Firm*—Foley & Lardner

[57] ABSTRACT

An automatic transmission has a friction element which induces a certain speed gear of the transmission when hydraulically operated. A fluid control circuit of the transmission comprises an accumulator valve unit which receives a line pressure for regulating a pressure of an operation fluid applied to the friction element in accordance with an engine load; and a shift valve which feeds the line pressure to the accumulator valve unit when assuming a first position and drains the operation fluid when assuming a second position. A flow restriction device is employed in the fluid control circuit for restricting the draining flow of the operation fluid.

13 Claims, 8 Drawing Sheets

FLUID CONTROL CIRCUIT OF AUTOMATIC TRANSMISSION

BACKGROUND OF THE INVENTION

1. Field of the Invention

The present invention relates in general to controllers of automatic transmissions, and more particularly to fluid control circuits of a type having means by which an operation fluid pressure of an friction element is suitably controlled during its rising and lowering.

2. Description of the Prior Art

In automatic transmissions, a desired speed gear is achieved by selecting and operating, with an aid of operation fluid pressure, some of friction elements which include clutches, brakes and the like. Usually, to suppress undesired shift shock and delayed response, feeding and discharging of the operation fluid pressure to and from an operation chamber of a selected friction element are carried out by using a suitable fluid control means.

U.S. Pat. No. 3,583,422 shows an automatic transmission having one of such fluid control means. This means of this publication is incorporated with a 1–2 accumulator valve unit. The accumulator valve unit controls an operation fluid pressure applied to a friction element, such as band brake or the like. The accumulator valve unit has an accumulator piston which varies the biasing force of an accumulator spring in accordance with the operation fluid pressure. The accumulator valve unit has further a pressure regulator valve which receives from axially opposed directions the biasing force of the accumulator spring and the force of the operation fluid pressure and receives an engine load corresponding pressure from the same direction as the biasing force of the accumulator spring. With this, the operation fluid pressure applied to the friction element is regulated.

Beside the above, another type fluid control means has been widely employed which is incorporated with an accumulator valve unit. The valve unit comprises an accumulator piston which varies the biasing force of an accumulator spring in accordance with the operation fluid pressure, and a pressure regulator valve which receives from axially opposed directions the biasing force of the accumulator spring and the force of the operation fluid pressure and receives an engine load corresponding force from the same direction as the biasing force of the accumulator spring. With this, the operation fluid pressure is regulated.

In the above-mentioned two types of fluid control means, due to the engine load corresponding pressure (former type) or force (latter type) and the biasing force of the accumulator piston, the rising behavior of the operation fluid pressure applied to the friction element is suitably controlled in accordance with the engine load. Thus, the engagement operation of the friction element is carried out smoothly, and thus undesired shift shock and delayed response are suppressed or at least minimized.

However, in the above-mentioned fluid control means, the suitable fluid pressure control is achieved only at the time when a speed gear change is effected by raising the operation fluid pressure. That is, such suitable fluid pressure control is not expected at the time when the speed gear change is effected by lowering or draining the operation fluid pressure. That is, as is understood from the time chart of FIGS. 8A, 8B and 8C, when the operation fluid pressure is suddenly lowered due to fluid draining, the output torque of the transmission and the engine speed are forced to show the illustrated behavior. That is, a sharp reduction of the output torque as indicated by reference "$\alpha$" and a sharp peak of the same as indicated by reference "$\beta$" are inevitably produced, which lowers the quality of speed gear change.

SUMMARY OF THE INVENTION

It is therefore an object of the present invention to provide a fluid control means of an automatic transmission, which is free of the above-mentioned drawback.

According to the present invention, there is provided a fluid control circuit of an automatic transmission, which can suitably control the operation fluid pressure in accordance with the engine load even at the time when the speed gear change is effected by draining the fluid.

According to the present invention, there is provided a fluid control circuit of an automatic transmission having a friction element which induces a certain speed gear of the transmission when hydraulically operated. The fluid control circuit comprises an accumulator valve unit which receives a line pressure for regulating a pressure of an operation fluid applied to the friction element in accordance with an engine load; a shift valve which feeds the line pressure to the accumulator valve unit when assuming a first position and drains the operation fluid when assuming a second position; and a flow restriction device for restricting the draining flow of the operation fluid.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, the description is directed to an exemplified case wherein the invention is applied to the fluid control for a band brake B/B which effects 1–2 up-shift when engaged upon charging of a fluid pressure and effects 2–1 down-shift when disengaged upon discharging of the fluid pressure. That is, engagement of the band brake B/B is carried out when an operation fluid pressure is applied thereto, while disengagement of the band brake B/B is carried out when the operation fluid pressure is released therefrom.

Figure 1:
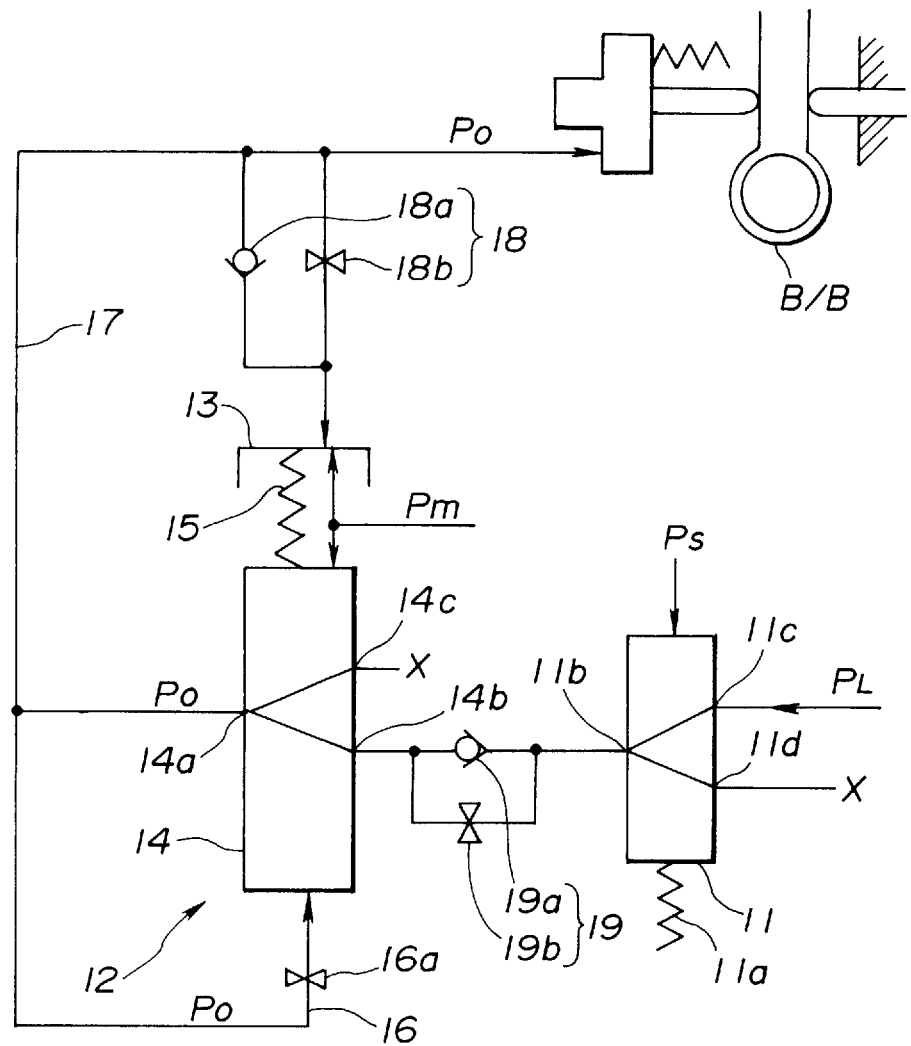
FIG. 1 shows an essential part of a fluid control circuit for an automatic transmission, which is a first embodiment of the present invention.

Referring to FIG. 1 of the drawings, there is shown an essential part of a fluid control circuit 100A of an automatic transmission, which is a first embodiment of the present invention.

The entire of the fluid control circuit other than the illustrated essential part may take any conventional circuits. These conventional control circuits are disclosed in for example U.S. Pat. No. 5,111,719 and U.S. Pat. No. 5,478,288 which are incorporated herein by reference.

In the drawing, denoted by numeral 11 is a 1–2 shift valve, and 12 is a 1–2 accumulator valve unit.

In a normal condition wherein no solenoid pressure "Ps" is applied to the 1–2 shift valve 11, only the biasing force of a spring 11a is applied to the valve 11 for allowing the same to take a position wherein an output port 11b is communicated with an input port 11c. While, when actually applied with the solenoid pressure "Ps", the 1–2 shift valve 11 is moved against the spring 11a to a position wherein the output port 11b is communicated with a drain port 11d. In forward speed gears, the input port 11c is kept fed with a line pressure "$P_L$".

The 1–2 accumulator valve unit 12 comprises an accumulator piston 13, a pressure regulator valve 14 and an accumulator spring 15 arranged therebetween. Due to operation of the accumulator spring 15, the pressure regulator valve 14 assumes a position wherein an output port 14a is communicated with an input port 14b. Thus, when, under this condition, the line pressure "$P_L$" is fed to the input port 14b from the 1–2 shift valve 11, the pressure regulator valve 14 outputs from the output port 14a thereof an operation fluid pressure "Po" using the line pressure "$P_L$" as a base pressure. The operation fluid pressure "Po" is fed to the band brake B/B through a circuit 17, and at the same time fed back to the pressure regulator valve 14 through a feedback circuit 16 and an orifice 16a. Denoted by numeral 14c is a drain port of the pressure regulator valve 14.

The operation fluid pressure "Po" in the circuit 17 is led to an external pressure receiving surface of the accumulator piston 13 through a flow restriction circuit 18. The flow restriction circuit 18 comprises a check valve 18a and an orifice 18b which are arranged in parallel, as shown. The check valve 18a is so arranged as to stop only the fluid flow directed from the circuit 17 toward the accumulator piston 13.

A pressure modifier pressure "Pm" is applied to both an internal pressure receiving surface of the accumulator piston 13 and an internal pressure receiving surface of the pressure regulator valve 14. As shown, the internal pressure receiving surface of the pressure regulator valve 14 faces the accumulator piston 13. The pressure modifier pressure "Pm" is an engine load corresponding pressure which is proportional to the engine load, for example, to the open degree of a throttle valve of the engine. That is, the pressure modifier pressure "Pm" increases proportionally with increase of the engine load.

As shown, between the output port 11b of the 1–2 shift valve 11 and the input port 14b of the pressure regulator valve 14, there is arranged a flow restriction circuit 19 which comprises a check valve 19a and an orifice 19b which are arranged in parallel. The check valve 19a is arranged to stop only the fluid flow directed from the input port 14b of the pressure regulator valve 14 toward the output port 11b of the 1–2 shift valve 11. Accordingly, the flow restriction circuit 19 can serve as an effectual one-way orifice when the operation fluid pressure "Po" is reduced.

In the following, operation of the fluid control circuit 100A of the first embodiment will be described.

For ease of explanation, the following description will be commenced with respect to 1–2 up-shift operation of an associated automatic transmission.

When, due to disappearance of the solenoid pressure "Ps", the 1–2 shift valve 11 takes the position of communicating the output port 11b with the input port 11c, the transmission is subjected to 1–2 up-shift. That is, at the first stage, the pressure regulator valve 14 is in the illustrated position, and thus the line pressure "$P_L$" from the 1–2 shift valve 11 is operatively fed to the pressure regulator valve 14 allowing the same to output an operation fluid pressure "Po" using the line pressure "$P_L$" as a base pressure. Thus, with increase of the operation fluid pressure "Po", engagement operation of the band brake B/B is advanced.

During this, the operation fluid pressure "Po" is fed back to the pressure regulator valve 14 through the feedback circuit 16, thereby biasing, with increase thereof, the pressure regulator valve 14 upward, that is, toward one position of communicating the output port 14a with the drain port 14c. At the same time, the operation fluid pressure "Po" is applied through the orifice 18b to the accumulator piston 13, thereby compressing, with increase thereof, the accumulator spring 15 against the pressure modifier pressure "Pm". Accordingly, with increase of the operation fluid pressure "Po", the accumulator spring 15 increases the force to bias the pressure regulator valve 14 downward in the drawing, thereby biasing the pressure regulator valve 14 toward the other position of communicating the output port 14a with the inlet port 14b. As shown in the drawing, during this, the pressure modifier pressure "Pm" biases the pressure regulator valve 14 downward in the drawing.

Accordingly, during increase of the operation fluid pressure "Po", the pressure regulator valve 14 regulates the operation fluid pressure "Po" while being moved in a manner to balance the upward and downward forces applied thereto.

Figure 6A:
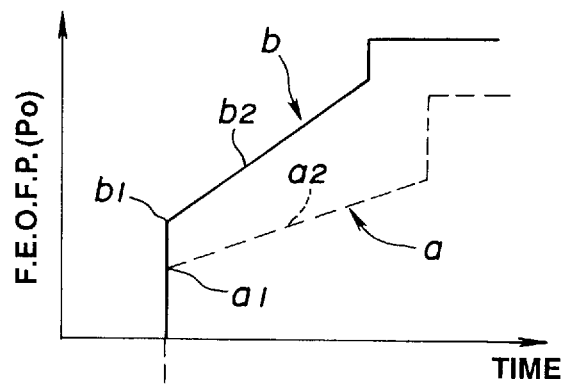
FIG. 6A is a time chart showing the behavior of an operation fluid pressure treated by the fluid control circuit of the first embodiment during rising of the operation fluid pressure.

As is described hereinabove, the pressure modifier pressure "Pm", which biases the pressure regulator valve 14 downward, is an engine load corresponding pressure which increases proportionally with increase of the engine load. Thus, as is seen from the time chart of FIG. 6A, under a certain lower engine load, the rising of the operation fluid pressure "Po" is carried out with a slower rising speed (see the gradient "a2") as indicated by the dotted line "a", while, under a certain higher engine load, the rising of the pressure "Po" is carried out with a higher rising speed (see the gradient "b2") as indicated by the solid line "b". Furthermore, as is seen from the time chart, the rising starting pressure "a1" of the pressure "Po" under the lower engine load is relatively low, while the rising starting pressure "b1" of the pressure "Po" under the higher engine load is relatively high.

Figure 6B:
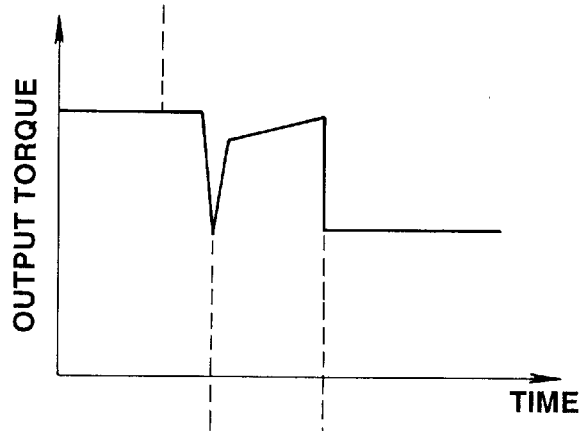
FIG. 6B is a time chart showing the behavior of an output torque of an associated automatic transmission, which is induced by the fluid pressure behavior depicted by FIG. 6A.
Figure 6C:
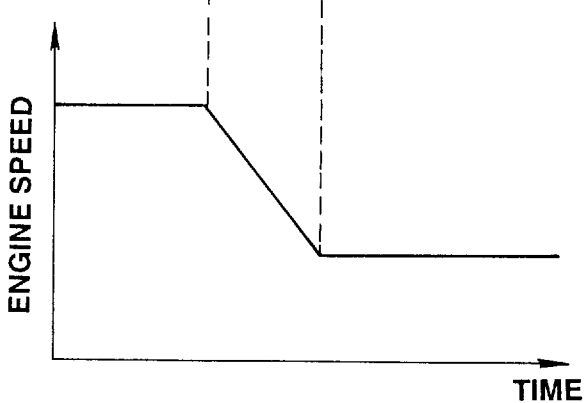
FIG. 6C is a time chart showing the behavior of a rotation speed of an associated engine, which is induced by the fluid pressure behavior depicted by FIG. 6A.

Accordingly, in any engine load, the band brake B/B can smoothly advance its engaging operation. As is understood from FIGS. 6B and 6C which respectively show the behavior of output torque of an associated transmission and that of an associated engine, during the 1–2 up-shift operation, undesired shift shock and delayed response are suppressed at least minimized.

In the following, the description will be directed to 2–1 down-shift operation of the associated transmission.

That is, when, due to appearance of the solenoid pressure "Ps", the 1–2 shift valve 11 is moved to the other position and thus communicates the output port 11b with the drain port 11d, the transmission is subjected to 2–1 down-shift.

That is, due to the above-mentioned movement of the 1–2 shift valve 11, the fluid in the fluid line downstream of the output port 11b is drained through the drain port 11d, and thus the operation fluid pressure "Po" is lowered. With lowering of the operation fluid pressure "Po", disengagement operation of the band brake B/B is advanced.

Figure 7A:
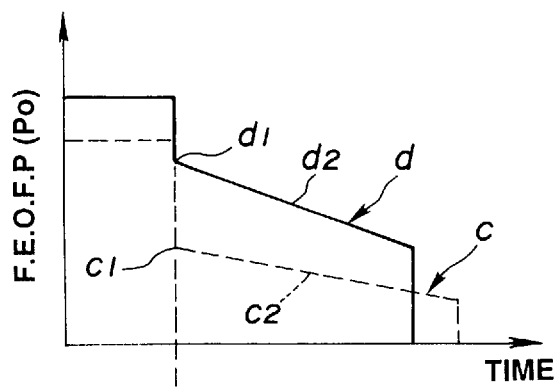
FIGS. 7A, 7B and 7C are time charts similar to those of FIGS. 6A, 6B and 6C, but showing the behaviors taken during lowering or draining of the operation fluid pressure; and, FIGS. 8A, 8B and 8C are time charts similar to those of FIGS. 7A, 7B and 7C, but showing the behaviors taken by a conventional fluid control circuit.

During this, the draining flow of the operation fluid is controlled or restricted by the orifice 19b. Since the return stoke of the accumulator piston 13, which is directed upward in the drawing, is effected by both the accumulator spring 15 and the pressure modifier pressure "Pm", the operation of the pressure regulator valve 14 causes the operation fluid pressure "Po" to show such a behavior as shown by FIG. 7A.

As is described hereinabove, the pressure modifier pressure "Pm" for biasing the accumulator piston 13 upward and the pressure regulator valve 14 downward is an engine load corresponding pressure which increases with increase of the engine load. Thus, as is seen from the time chart of FIG. 7A, under a certain lower engine load, the lowering of the operation fluid pressure "Po" is carried out with a slower lowering speed (see the gradient "c2") as indicated by the dotted line "c", while, under a certain higher engine load, the lowering of the pressure "Po" is carried out with a higher lowering speed (see the gradient "d2") as indicated by the solid line "d". Furthermore, as is seen the time chart, the lowering starting pressure "c1" of the pressure "Po" under the lower engine load is relatively low, while, the lowering starting pressure "d1" of the pressure "Po" under the higher engine load is relatively high.

Figure 7B:
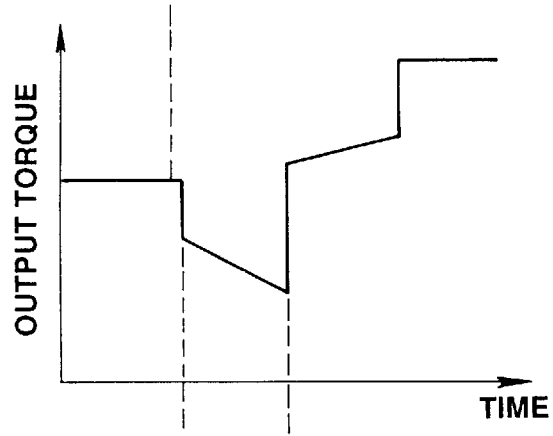
Figure 7C:
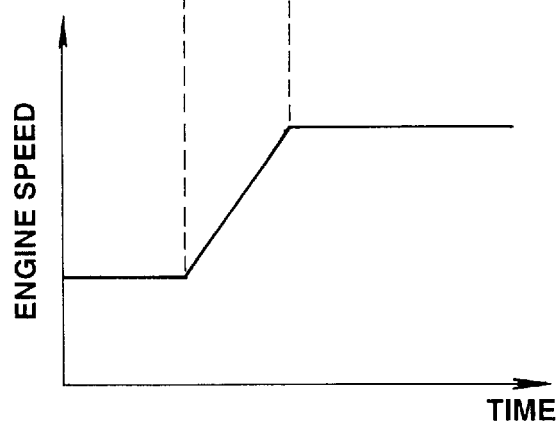
Figure 8A:
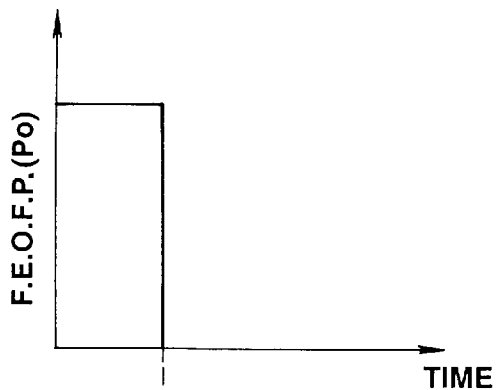
Figure 8B:
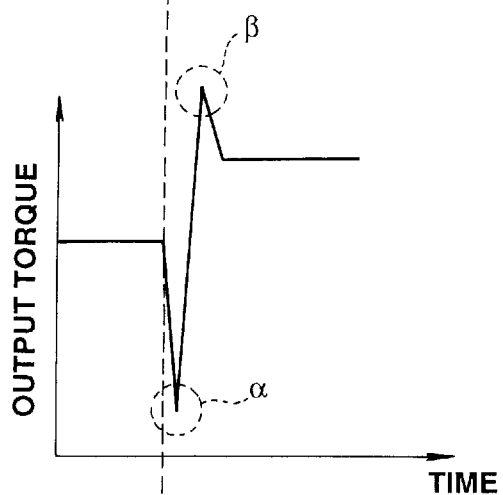
Figure 8C:
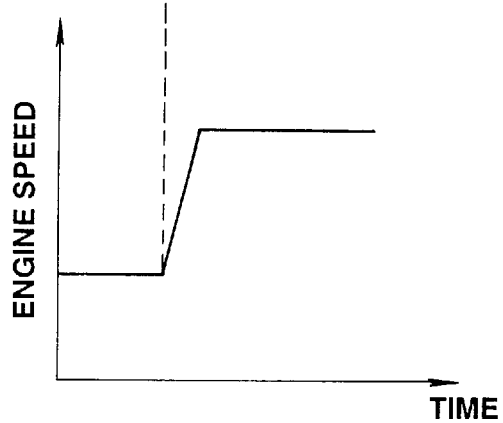

Accordingly, in any engine load, the band brake B/B can smoothly advance its disengaging operation. As is understood from FIGS. 7B and 7C which respectively show the behavior of output torque of the associated transmission and that of the associated engine speed, during the 2–1 down-shift operation, undesired phenomena such as sharp reduction of the output torque of the transmission, sharp peak of the same and the like are suppressed or at least minimized. Thus, the quality of speed gear change in case of draining the operation fluid, that is, the quality of the change to the 2–1 down-shift is improved.

Figure 2:
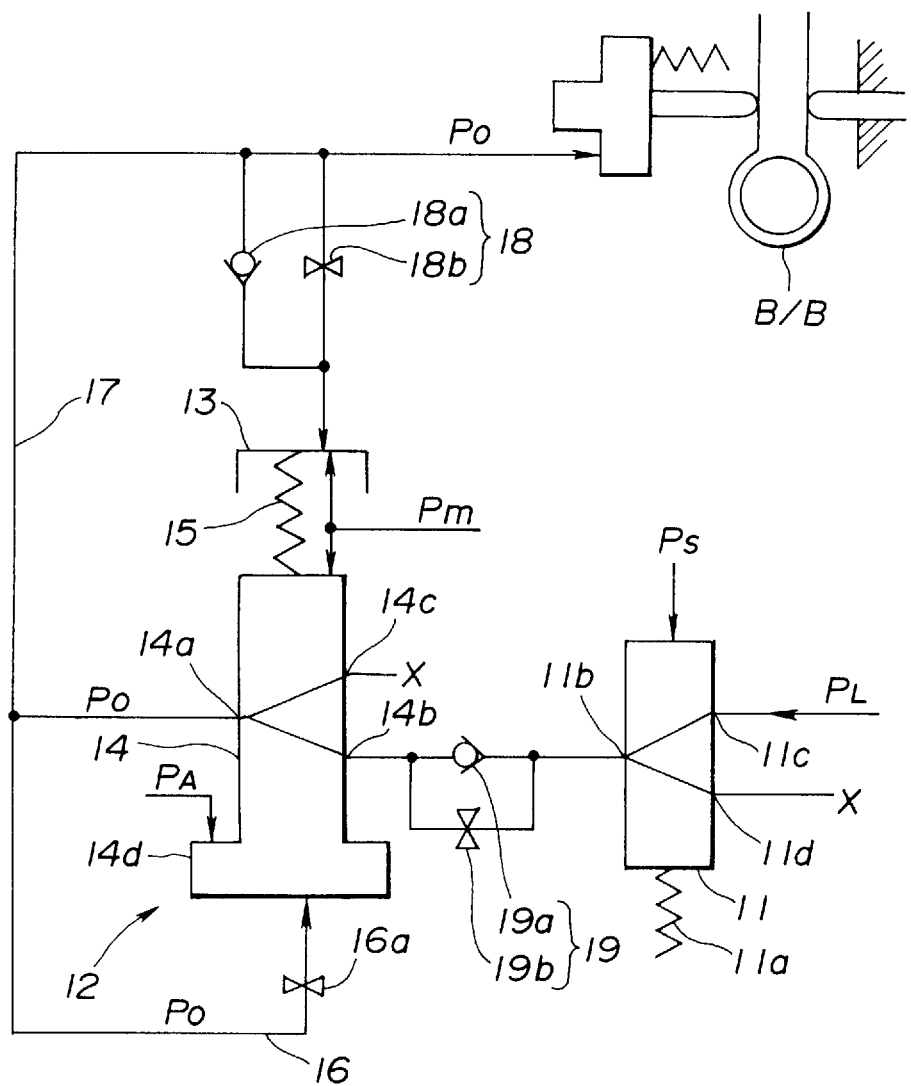
FIG. 2 is a view similar to FIG. 1, but showing a second embodiment of the present invention.

Referring to FIG. 2, there is shown an essential part of a fluid control circuit 100B which is a second embodiment of the present invention.

Since this embodiment 100B is similar to the above-mentioned first embodiment 100A, only portions which are different from those of the first embodiment 100A will be described in the following.

That is, in this second embodiment 100B, the pressure regulator valve 14 is formed with an enlarged lower end 14d to which an accumulator control pressure "$P_A$" is applied to bias the same downward in the drawing. That is, in this second embodiment, the pressure regulator valve 14 is biased downward by both the pressure modifier pressure "Pm" and the accumulator control pressure "$P_A$". The accumulator control pressure "$P_A$" is an engine load representing signal pressure which increases with increase of the engine load. Thus, the accumulator control pressure "$P_A$" may be the same as the pressure modifier pressure "Pm".

According to the second embodiment 100B, the rising starting pressures "a1" and "b1" of the operation fluid pressure "Po" (see FIG. 6A) and the pressure rising speeds "a2" and "b2" under the lower and higher engine loads are varied by also the accumulator control pressure "$P_A$".

Unlike the pressure modifier pressure "Pm" which is applied to both the pressure regulator valve 14 and the accumulator piston 13, the accumulator control pressure "$P_A$" is applied to only the pressure regulator valve 14. Accordingly, the lowering behavior of the operation fluid pressure "Po" (see FIG. 7A) is not affected by the accumulator control pressure "$P_A$". That is, in this second embodiment 100B, the increasing behavior of the operation fluid pressure "Po" can be varied in various manner while having no effect on the lowering behavior of the same.

Figure 3:
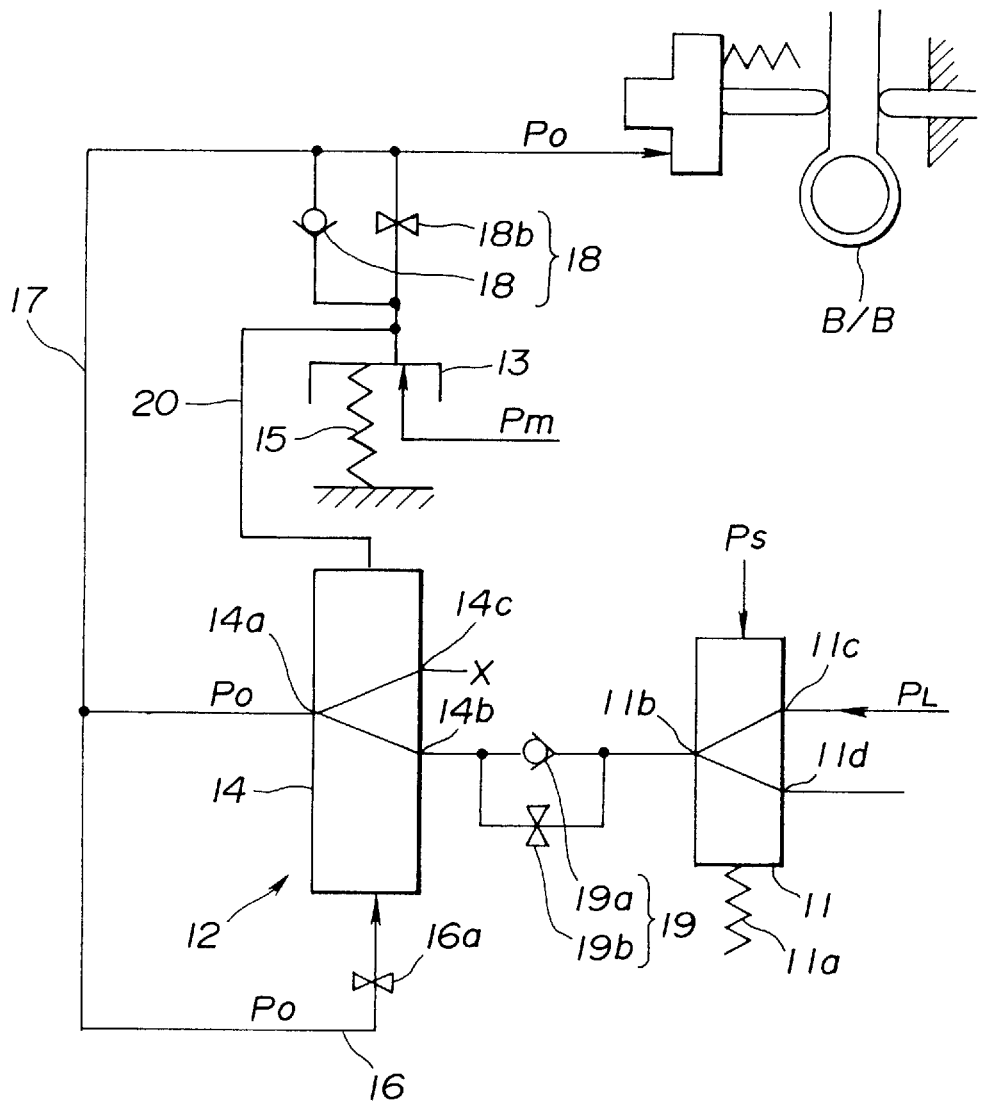
FIG. 3 is a view similar to FIG. 1, but showing a third embodiment of the present invention.

Referring to FIG. 3, there is shown a part of a fluid control circuit 100C which is a third embodiment of the present invention.

Since this embodiment 100C is similar to the above-mentioned first embodiment, only portions which are different from those of the first embodiment 100A will be described in the following.

In this third embodiment, the force of the accumulator spring 15 and that of the pressure modifier pressure "Pm" are not directly applied to the pressure regulator valve 14. That is, through a circuit 20, the fluid pressure appearing in an output port of the flow restriction circuit 18 is directly applied to the pressure regulator valve 14 to bias the same downward in FIG. 3. More specifically, the fluid pressure modified by the accumulator spring 15 and the pressure modifier pressure "Pm" is applied to the pressure regulator valve 14 through the circuit 20.

Since the pressure regulator valve 14 is biased downward by the modified fluid pressure in a manner similar to the case of the above-mentioned first embodiment, substantially the same advantages as those of the first embodiment are obtained in this third embodiment.

In addition to the above, the third embodiment 100C has further the following advantage.

That is, in the third embodiment 100C, in accordance with the ratio between a pressure receiving area of the pressure regulator valve 14 to which the fluid pressure appearing in the output port of the flow restriction circuit 18 is applied through the circuit 20 and a pressure receiving area of the accumulator piston 13 to which the fluid pressure appearing in the output port of the flow restriction circuit 18 is applied, the biasing force applied to the pressure regulator valve 14 by the accumulator spring 15 and the pressure modifier pressure "Pm" can be varied freely. Thus, the behavior of the operation fluid pressure "Po" to the pressure modifier pressure "Pm" can be varied freely, which increases the freedom in designing the control circuit.

If desired, like in the case of the above-mentioned second embodiment, an accumulator control pressure "$P_A$" may be applied to only the pressure regulator valve 14 to bias the same upward in the drawing. In this case, substantially the same advantages as those of the second embodiment are obtained.

Figure 4:
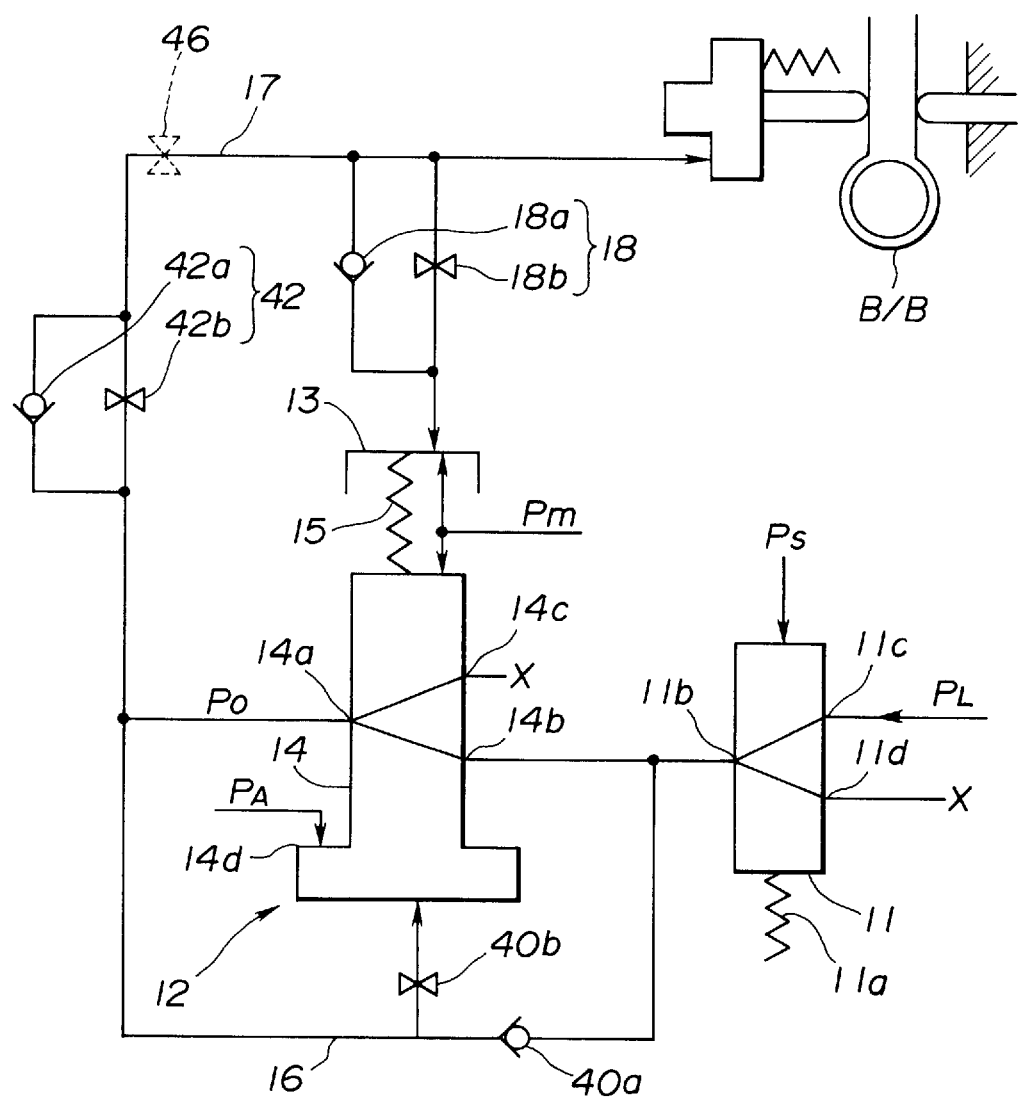
FIG. 4 is a view similar to FIG. 2, but showing a fourth embodiment of the present invention.

Referring to FIG. 4, there is shown a part of a fluid control circuit 100D which is a fourth embodiment of the present invention.

Since this embodiment 100D is similar to the above-mentioned second embodiment 100B, only portions which are different from those of the second embodiment 100B will be described in the following.

That is, in the fourth embodiment 100D, the output port 11b of the 1–2 shift valve 11 is directly connected to the input port 14b of the pressure regulator valve 14. The operation fluid pressure "Po" from the outlet port 14a of the pressure regulator valve 14 is applied to the enlarged lower end 14d of the valve 14 through an orifice 40b. A check valve 40a is disposed between the output port 14a of the pressure regulator valve 14 and the output port 11b of the 1–2 shift valve 11 in such a manner as to permit only the fluid flow directed from the output port 14a to the output port 11b, as shown. Furthermore, between the output port 14a of the pressure regulator valve 14 and the brake band B/B, there is disposed a flow restriction circuit 42 which comprises a check valve 42a and an orifice 42b which are arranged in parallel. The check valve 42a is so arranged as to stop only the fluid flow directed from the brake band B/B toward the output port 14a of the pressure regulator valve 14.

If desired, an orifice 46 illustrated by a broken line may be disposed in the circuit 17 between the flow restriction circuit 42 and the other flow restriction circuit 18.

In the following, operation of the fluid control circuit 100D of the fourth embodiment will be described.

When, due to disappearance of the solenoid pressure "Ps", the 1–2 shift valve 11 takes the position of communicating the output port 11b with the input port 11c, the transmission is subjected to 1–2 up-shift. That is, at the first stage, the pressure regulator valve 14 is in the illustrated position, and thus, the line pressure "$P_L$" from the 1–2 shift valve 11 is operatively fed to the pressure regulator valve 14 allowing the same to output an operation fluid pressure "Po". Thus, with increase of the operation pressure "Po", engagement operation of the band brake B/B is advanced. Due to the orientation of the check valve 42a, the fluid flow from the pressure regulator valve 14 to the band brake B/B through the circuit 17 is smoothly carried out.

During this, the operation fluid pressure "Po" is fed back to the pressure regulator valve 14 through the feedback circuit 16, thereby biasing, with increase thereof, the pressure regulator valve upward, that is, toward one position of communicating the output port 14a with the drain port 14c. At the same time, the operation fluid pressure "Po" is applied through the orifice 18b to the accumulator piston 13, thereby compressing, with increase thereof, the accumulator spring 15 against the pressure modifier pressure "Pm". Accordingly, with increase of the operation fluid pressure "Po", the accumulator spring 15 increases the force to bias the pressure regulator valve 14 downward, thereby biasing the pressure regulator valve 14 to the other position of communicating the output port 14a with the inlet port 14b.

Furthermore, at the same time, an accumulator control pressure "$P_A$" is applied to the enlarged lower end 14d of the pressure regulator valve 14 to bias the same downward.

That is, during increase of the operation fluid pressure "Po", the pressure regulator valve 14 regulates the operation fluid pressure "Po" while being moved in a manner to balance the upward and downward forces applied thereto. Accordingly, for the reasons as described in the section of the first embodiment 100A, in any engine load, the band brake B/B can smoothly advance its engaging operation.

If the orifice 46 is present on the circuit 17, the smoothed engaging operation of the band brake B/B is much promoted. That is, with provision of such orifice 46, rush phenomenon of the fluid pressure, which would occur at an initial stage of pressure increase, is effectively suppressed.

When, due to appearance of the solenoid pressure "Ps", the 1–2 shift valves 11 is moved to the other position and thus communicates the output port 11b with the drain port 11d, the transmission is subjected to 2–1 down-shift.

That is, due to the above-mentioned movement of the 1–2 shift valve 11, the fluid in the fluid line downstream of the output port 11b is drained through the drain port 11d, and thus, the operation fluid pressure "Po" is lowered. With lowering of the operation fluid pressure "Po", the disengagement operation of the band brake B/B is advanced.

During this, the draining flow of the operation fluid is controlled or restricted by the orifice 42b. Accordingly, for the reasons as mentioned in the section of the first embodiment 100A, in any engine load, the band brake B/B can smoothly advance its disengaging operation.

Figure 5:
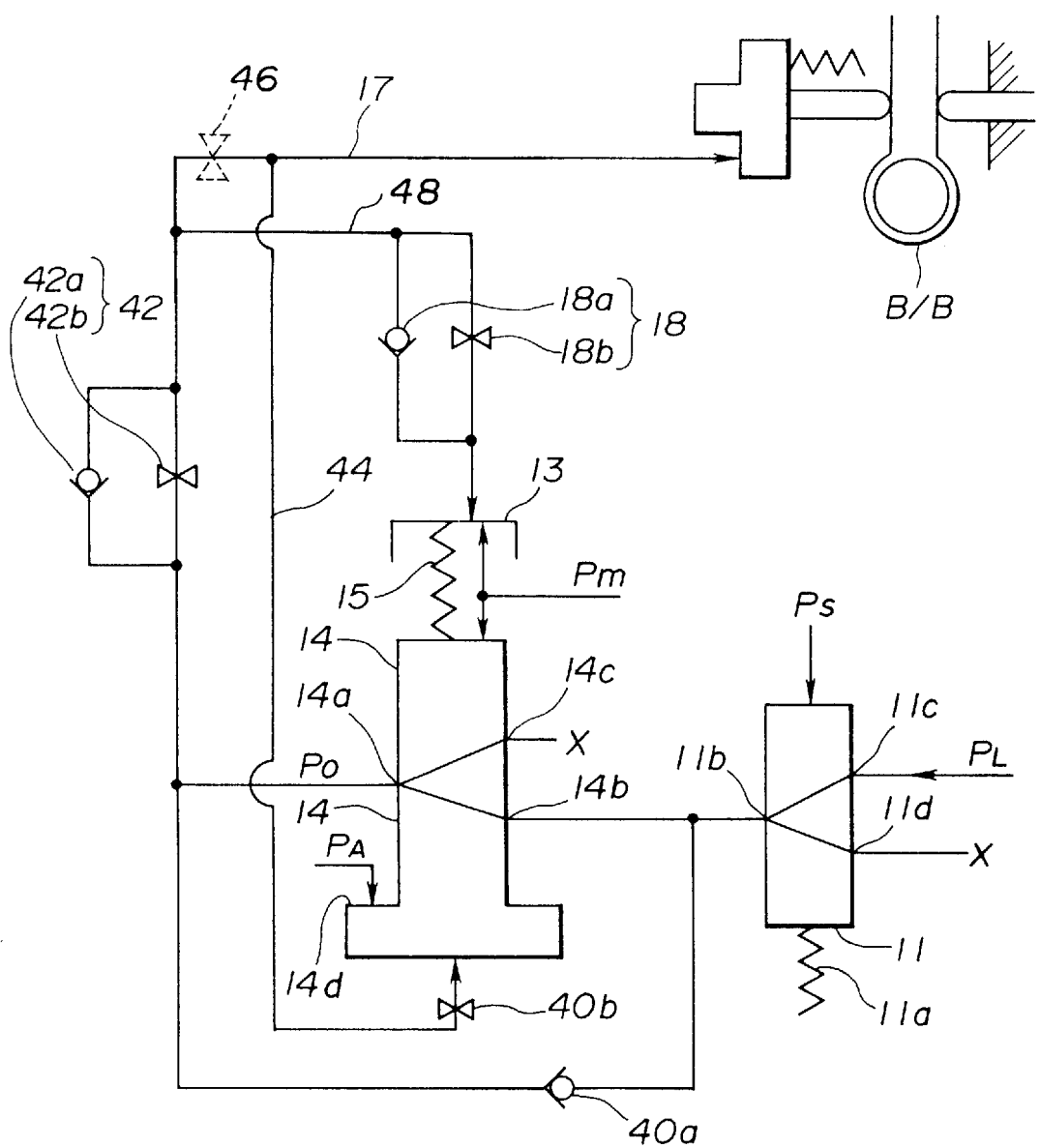
FIG. 5 is a view similar to FIG. 4, but showing a fifth embodiment of the present invention.

Referring to FIG. 5, there is shown a part of a fluid control circuit 100E which is a fifth embodiment of the present invention.

Since this embodiment 100E is similar to the above-mentioned fourth embodiment 100D, only portions which are different from those of the fourth embodiment 100D will be described in the following.

That is, in this fifth embodiment 100E, the biasing force for biasing the pressure regulator valve 14 upward is produced by the fluid pressure appearing downstream of the flow restriction circuit 42. For this biasing, a fluid line 44 extending from the circuit 17 to the orifice 40b is employed. As shown, the downstream end of the flow restriction circuit 42 is connected to an upstream end of the other flow restriction circuit 18 through a separate circuit 48.

If desired, an orifice 46 illustrated by a broken line may be disposed between the flow restriction circuit 42 and the orifice 40b.

When the 1–2 shift valve 11 takes the position of communicating the output port 11b with the input port 11c, the transmission is subjected to 1–2 up-shift. At the first stage, the pressure regulator valve 14 is in the illustrated position, and thus, the line pressure "$P_L$" from the 1–2 shift valve 11 is operatively fed to the pressure regulator valve 14 allowing the same to output an operation fluid pressure "$P_o$". Thus, with increase of the operation pressure "$P_o$", engagement operation of the band brake B/B is advanced. Due to the orientation of the check valve 42a, the fluid flow from the pressure regulator valve 14 to the band brake B/B through the circuit 17 is smoothly carried out.

During this, part of the pressure directed to the band brake B/B is fed to the pressure regulator valve 14 through the fluid line 44 thereby biasing, with increase thereof, the pressure regulator valve upward, that is, toward one position of communicating the output port 14a with the drain port 14c. At the same time, the operation fluid pressure "Po" is applied through the orifice 18b to the accumulator piston 13 thereby compressing, with increase thereof, the accumulator spring 15 against the pressure modifier pressure "Pm". Thus, with increase of the operation fluid pressure "Po", the accumulator spring 15 increases the force to bias the pressure regulator valve 14 downward, thereby biasing the pressure regulator valve 14 to the other position of communicating the output port 14a with the inlet port 14b.

Furthermore, at the same time, the accumulator control pressure "$P_A$" is applied to the enlarged lower end 14d of the pressure regulator valve 14 to bias the same downward.

That is, during increase of the operation fluid pressure "Po", the pressure regulator valve 14 regulates the operation fluid pressure "Po" while being moved in a manner to balance the upward and downward forces applied thereto. Accordingly, in any engine load, the band brake B/B can smoothly advance its engaging operation.

If the orifice 46 is present on the circuit 17, the smoothed engaging operation of the band brake B/B is much promoted. That is, with provision of such orifice 46, rush of the fluid pressure, which would occur at an initial stage of pressure increase, is suppressed.

When the 1–2 shift valve 11 is moved to the other position and thus communicates the output port 11b with the drain port 11d, the transmission is subjected to 2–1 down-shift.

Due to the movement of the 1–2 shift valve 11, the fluid in the fluid line downstream of the output port 11b is drained through the drain port 11d, and thus, the operation fluid pressure "Po" is lowered. With lowering of the operation fluid pressure "Po", the disengaging operation of the band brake B/B is advanced.

During this, the draining flow of the operation fluid is controlled or restricted by the orifice 42b. Accordingly, in any engine load, the band brake B/B can smoothly advance its disengaging operation.

What is claimed is:

1. A fluid control circuit of an automatic transmission having a friction element which induces a certain speed gear of the transmission when hydraulically operated, said fluid control circuit comprising:

an accumulator valve unit which receives a line pressure for regulating a pressure of an operation fluid applied to the friction element in accordance with an engine load;

a shift valve which feeds the line pressure to said accumulator valve unit when assuming a first position and drains said operation fluid when assuming a second position; and a flow restriction device for restricting the draining flow of said operation fluid.

2. A fluid control circuit as claimed in claim 1, in which said flow restriction device comprises:

a check valve; and an orifice arranged in parallel with said check valve.

3. A fluid control circuit as claimed in claim 2, in which said flow restriction device is arranged in a fluid line which extends from an output port of said shift valve to an input port of said accumulator valve unit, and in which said check valve is arranged to stop only a fluid flow from the input port of said accumulator valve unit toward the output port of said shift valve.

4. A fluid control circuit as claimed in claim 3, in which said accumulator valve unit comprises:

a pressure regulator valve which is axially movable;

a first biasing means which biases said pressure regulator valve in one direction in accordance with a first force produced by both the operation fluid pressure and a pressure modifier pressure; and a second biasing means which biases said pressure regulator valve in the other direction in accordance with a second force produced by only the operation fluid pressure.

5. A fluid control circuit as claimed in claim 4, in which said first biasing means comprises:

an accumulator piston having an external pressure receiving surface to which said operation fluid pressure is applied;

an accumulator spring compressed between said accumulator piston and one end of said pressure regulator valve;

means for biasing said accumulator piston and said pressure regulator valve in opposed directions in accordance with said pressure modifier pressure; and another flow restriction device through which said operation fluid pressure is fed to the external pressure receiving surface of said accumulator piston.

6. A fluid control circuit as claimed in claim 4, in which said second biasing means comprises:

a pressure receiving surface defined by the other end of said pressure regulator valve; and means for applying the operation fluid pressure to said pressure receiving surface of the pressure regulator valve.

7. A fluid control circuit as claimed in claim 4, in which said pressure regulator valve is formed with an enlarged end portion to which an accumulator control pressure is applied to bias the pressure regulator valve in the same direction as the biasing force of said first biasing means.

8. A fluid control circuit as claimed in claim 4, in which said first biasing means comprises:

an accumulator piston having an external pressure receiving surface to which said operation fluid pressure is applied;

an accumulator spring compressed between said accumulator piston and a fixed member;

means for biasing said accumulator piston in the same direction as the biasing force of said accumulator spring in accordance said pressure modifier pressure;

another flow restriction device through which said operation fluid pressure is fed to the external pressure receiving surface of said accumulator piston; and means for biasing said pressure regulator valve in said one direction in accordance with the fluid pressure applied to said external pressure receiving surface of said accumulator piston.

9. A fluid control circuit as claimed in claim 2, in which said flow restriction device is arranged in a fluid line which extends from an output port of said accumulator valve unit to a hydraulic actuator means of said friction element, and in which said check valve is arranged to stop only a fluid flow from said hydraulic actuator means toward said output port of said accumulator valve unit.

10. A fluid control circuit as claimed in claim 9, in which said accumulator valve unit comprises:

a pressure regulator valve which is axially movable;

first biasing means which biases said pressure regulator valve in one direction in accordance with a first force produced by both the operation fluid pressure and a pressure modifier pressure;

second biasing means which biases said pressure regulator valve in the other direction in accordance with a second force produced by only the operation fluid pressure; and third biasing means which, in accordance with an accumulator control pressure applied thereto, biases said pressure regulator valve in the same direction as the biasing force of said first biasing means.

11. A fluid control circuit as claimed in claim 10, in which said second biasing means comprises:

a pressure receiving surface defined by an end of said pressure regulator valve;

means for applying the operation fluid pressure to said pressure receiving surface; and means for allowing a flow of said operation fluid pressure to the inlet port of said accumulator valve unit.

12. A fluid control circuit as claimed in claim 10, in which said second biasing means comprises:

a pressure receiving surface defined by an end of said pressure regulator valve;

means for applying to said pressure receiving surface the operation fluid pressure which appears in the fluid line between said flow restriction device and the hydraulic actuator means of said friction element; and means for allowing a flow of said operation fluid pressure to the inlet port of said accumulator valve unit.

13. A fluid control circuit as claimed in claim 9, further comprising an orifice which is disposed in a fluid line which extends between said flow restriction device and the hydraulic actuator means of said friction element.

* * * * *